July 3, 1928.

H. WEICHSEL

ALTERNATING CURRENT MOTOR

Filed March 24, 1926

1,675,677

INVENTOR
Hans Weichsel
BY E. E. Huffman
ATTORNEY

Patented July 3, 1928.

1,675,677

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed March 24, 1926. Serial No. 96,932.

My invention relates to synchronous motors, one of its objects being to produce a self-excited machine of this type in which the primary winding is on the stator and the line current does not therefore have to be carried by slip rings. Another object is to provide means whereby such a machine will have increased exciting current with increasing load and therefore satisfactory power factor throughout load range. The machine herein described also has a good synchronizing torque.

Figure 1:
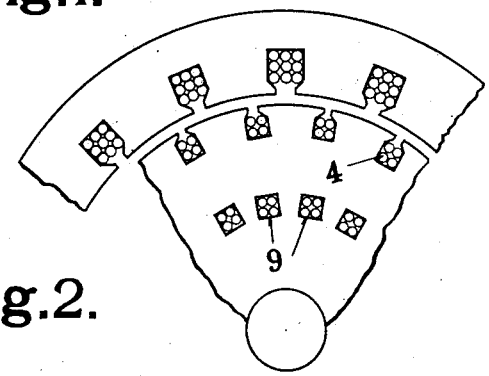
Figure 2:
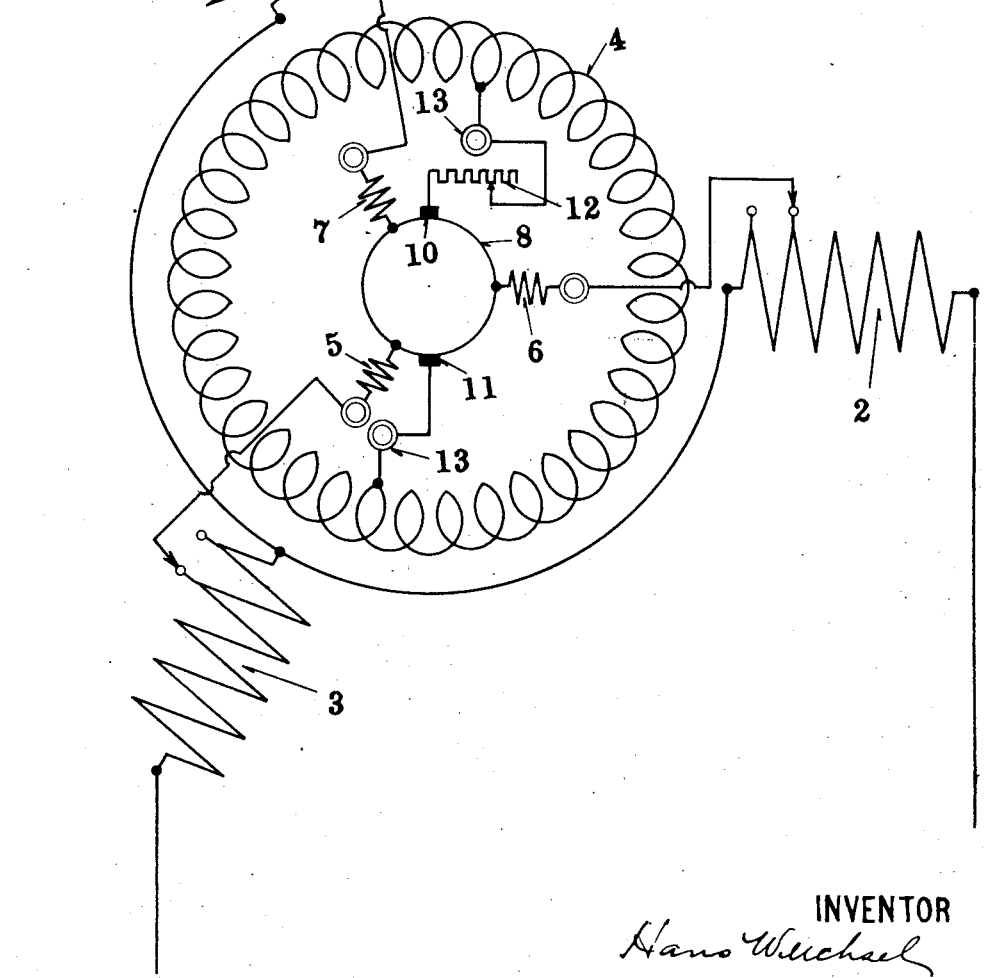

In the accompanying drawings Figure 1 illustrates rotor and stator laminæ of a machine embodying my invention and the location of the windings therein; and Figure 2 is a circuit diagram of the machine.

The stator is provided with a three-phase winding 1, 2, 3 and the rotor carries an exciting winding 4 located in peripheral slots. A three-phase converter winding 5, 6, 7 has a portion 8 connected to a commutator and a three-phase current of line frequency is supplied to the winding through slip rings. This current may be derived by connecting the slip rings to taps on the stator winding, as shown. The converter winding is located in imbedded slots 9 for the purpose of wholly of substantially removing it from the inductive influence of the stator winding. The exciting winding 4 is connected to brushes 10, 11 on the commutator, through starting resistance 12, by means of slip rings 13. The brushes preferably have the particular position hereinafter described.

Referring to the operation of the machine, the stator inducing winding produces a revolving field which at starting cooperates with the exciting winding 4 to produce starting torque, this winding being at that time closed over the starting resistance 12, and the machine therefore starts as an induction motor. The converter winding is connected to the supply in such direction as to produce a field revolving in the opposite direction from the field produced by the stator winding. When the rotor reaches synchronous speed current is no longer induced in the exciting winding 4 from the stator but at this speed direct current E. M. F. appears at the brushes 10, 11 for the reasons well understood, and the winding 4 becomes the direct current exciting winding of the motor.

Since the alternating field produced by the converter winding revolves in the opposite direction from the field produced by the stator winding and therefore in the direction opposite to the direction of rotation of the rotor, the alternating current field produced by the converter winding at synchronism will be stationary in space, and I so position brushes 10, 11 that they are displaced less than 90 degrees from the axis of this stationary field when the machine is operating at no load. The result of so positioning the brushes is that when the space relation of an axis of the rotor to an axis of the revolving stator field changes with increase of load, the angle between the brushes and the field produced by the converter winding increases thereby resulting in an increase of the direct current voltage impressed on the exciting winding and therefore an increase in the exciting current. In synchronous machines of the kind described which have no defined polar projections and small air gap, the power factor changes with increasing load unless means are provided to compensate for the change in electrical conditions resulting from increase of the line current. The automatic increase of exciting current with increasing load secured in the manner described provides this compensation and causes the power factor to remain satisfactory throughout the load range.

Having fully described my invention, what I claim as new and desire to secure by Letters Patent of the United States is:

1. In a synchronous motor, the combination of a stator provided with an inducing winding, a rotor having a direct current exciting winding and a converter winding provided with a commutator and slip rings, said converter winding being in poor inductive relation with the stator winding, means for impressing an alternating current on the converter winding, and means for impressing on the exciting winding a direct current E. M. F. derived from the converter winding.

2. In a synchronous motor, the combination of a stator provided with an inducing winding, a rotor having a direct current exciting winding and a converter winding provided with a commutator and slip rings, said converter winding being in poor inductive relation with the stator winding, means for impressing an alternating current on the converter winding, and brushes on the commutator in circuit with the exciting winding, said brushes being so positioned that the E. M. F. impressed thereon from the commutator increases with increasing load.

3. In a synchronous motor, the combination of a stator provided with an inducing winding, a rotor having a direct current exciting winding located in peripheral slots and a converter winding separated from the exciting winding by means forming a path permitting a portion of the stator flux to link with the exciting winding without linking with the converter winding, means for impressing alternating current on the converter winding, and means for deriving a direct current E. M. F. from the converter winding and impressing it on the exciting winding.

4. In a synchronous motor, the combination of a stator provided with an inducing winding, a rotor provided with peripheral slots and with slots positioned within the periphery, an exciting winding in the peripheral slots, a converter winding in the second mentioned slots, a commutator and brushes cooperating with the converter winding, said brushes being in circuit with the exciting winding, and means for impressing an alternating E. M. F. on the converter winding, the brushes being so positioned that the E. M. F. derived thereby from the commutator increases with increasing load.

5. In a synchronous motor, the combination of a stator provided with an inducing winding, a rotor having a direct current exciting winding and a converter winding provided with a commutator and slip rings, said converter winding being in poor inductive relation with the stator winding, means for impressing an alternating current E. M. F. on the converter winding whose magnitude is proportional to the line E. M. F., and means for impressing on the exciting winding a direct current E. M. F. derived from the converter winding.

In testimony whereof, I hereunto affix my signature, this 18th day of March, 1926.

HANS WEICHSEL.